(12) United States Patent
DeCaro et al.

(10) Patent No.: US 8,963,858 B2
(45) Date of Patent: Feb. 24, 2015

(54) USE OF RESISTIVE TOUCH SCREEN AS A PROXIMITY SENSOR

(75) Inventors: Robert Edward DeCaro, San Juan Capistrano, CA (US); Jean-Paul Bardyn, Concise (CH); Olivier Nys, Neuchatel (CH)

(73) Assignee: Semtech Corporation, Camarillo, CA (US)

( * ) Notice: Subject to any disclaimer, the term of this patent is extended or adjusted under 35 U.S.C. 154(b) by 86 days.

(21) Appl. No.: 13/406,352

(22) Filed: Feb. 27, 2012

(65) Prior Publication Data

US 2012/0218210 A1 Aug. 30, 2012

(51) Int. Cl.
G06F 3/041 (2006.01)
G06F 3/044 (2006.01)
G06F 3/045 (2006.01)

(52) U.S. Cl.
CPC ............... *G06F 3/044* (2013.01); *G06F 3/045* (2013.01); *G06F 2203/04106* (2013.01); *G06F 2203/04108* (2013.01)
USPC ......................................................... 345/173

(58) Field of Classification Search
CPC ....................................................... G06F 3/041
USPC ......................................................... 345/173
See application file for complete search history.

(56) References Cited

U.S. PATENT DOCUMENTS

| 6,246,862 B1 * | 6/2001 | Grivas et al. .................. 455/566 |
| 7,307,626 B2 * | 12/2007 | Martchovsky ................ 345/174 |
| 7,362,313 B2 * | 4/2008 | Geaghan et al. ............... 345/173 |
| 7,852,323 B2 * | 12/2010 | Parkinson et al. ............. 345/173 |

* cited by examiner

*Primary Examiner* — Amare Mengistu
*Assistant Examiner* — Shawna Stepp Jones
(74) *Attorney, Agent, or Firm* — Fitzsimmons IP Law

(57) ABSTRACT

An apparatus and method for the use of a resistive touch screen as a proximity sensor. The touch screen operates in a touch sensing mode and a proximity sensing mode. The proximity sensing mode turns off the touch sensing circuit and uses the equivalent capacitor formed by the top layer of the touch screen with a nearby object to detect proximity. A control circuit selectively connects the touch screen with measurement circuits to perform each of the sensing functions. The control circuit can be implemented with timing based control or an event driven topology.

15 Claims, 6 Drawing Sheets

USE OF RESISTIVE TOUCH SCREEN AS A PROXIMITY SENSOR

RELATED APPLICATION DATA

This application claims priority pursuant to 35 U.S.C. §119(e) to U.S. provisional patent application Ser. No. 61/447,344 filed Feb. 28, 2011, the subject matter of which is incorporated by reference herein in its entirety.

BACKGROUND OF THE INVENTION

1. Field of the Invention

The present invention relates to resistive touch screens, and more particularly, the use of a resistive touch screen as a proximity sensor.

2. Description of Related Art

Resistive touch screens are well known in the art and are used by electronic devices as inputs to detect physical touches by the user. The most common resistive touch screens are the 4-wire resistive touch screen and 5-wire resistive touch screens.

A 4-wire resistive touch screen comprises multiple resistive layers that are separated by thin spaces. When a user touches a screen with a finger or stylus, physical pressure is applied to the layers, which in turn, causes the layers to touch at the point where the pressure is being applied. To determine the exact location of the touch, a voltage gradient is first applied horizontally to the top resistive layer. The bottom resistive layer is used to measure the voltage level of the top resistive layer at the point of touch between the two resistive layers. The horizontal coordinate is determined based on the voltage level at the point of touch. For example, if a voltage gradient of 0 to 5 volts were applied horizontally to the top resistive layer such that one end of the top resistive layer is at 0 volts and the other end is at 5 volts, a measurement of 2.5 volts would indicate the touch point to be in the middle of the horizontal axis. A voltage gradient is then applied vertically to the bottom resistive layer and the top resistive layer is used to measure the voltage at the touch point, thus providing the vertical coordinate.

A 5-wire resistive touch screen also contains two layers. The top layer is a low impedance conductive layer and the bottom layer is a resistive layer. The bottom layer contains four electrical conductors, one at each corner. When the screen is touched, the top layer makes contact with the bottom layer. To determine the horizontal coordinate of the touch, a voltage gradient is applied to the bottom layer using the two electrical conductors located at the left or right side of the bottom layer. The top conductor layer is then used to measure the voltage level at the point of the touch. Similar to the 4-wire resistive touch screen, the horizontal coordinate is determined based on the voltage level at the point of the touch. To determine the vertical coordinate of the touch, a voltage gradient is applied to the bottom layer using the two electrical conductors located at the top or bottom side of the bottom layer. The top conductor layer is then used to measure the voltage level at the point of the touch and the vertical coordinate is determined based on the voltage level.

Both 4-wire and 5-wire resistive touch screens typically have a large capacitance between the top and bottom layers because of the close proximity between the two layers.

Resistive touch screens are often used in mobile devices that have both a touch screen and a liquid crystal display (LCD) or similar type of display. Tablet computers and smartphones are some examples of such devices. Due to the mobile nature of the devices, power saving is an important consideration, and individual components should be deactivated when not in use. For example, when a user is talking on the phone, the display is not required to be on. Thus, the ability for the phone to sense when a user is holding the phone close to, or adjacent to the ear, would allow the designer to save power by turning off the display during that time.

FIG. 1 depicts a simplified circuit diagram of a system that is typical of the prior art. The system 101 contains two separate and distinct components: a photodiode-based proximity sensor component 103 to detect the proximity of the user, and a resistive-touch-screen component 105 to detect user inputs. The proximity sensor component 103 contains an infrared photoemitter (IRLED) driver 109, IRLED 115, photodiode 111, and photodiode sensor 107. When an object approaches system 101, the amount of light that photodiode 111 is exposed to changes, resulting in a change in current level generated from photodiode 111. Photodiode sensor 107 detects the current change, allowing the system to react to the approach of the object accordingly. The resistive touch screen component 105 contains resistive control circuit 123, resistive sensor 121, top resistive layer 117 and bottom resistive layer 119 of the resistive screen. When a user presses down on top resistive layer 117, it makes contact with bottom resistive layer 119 at the coordinate where the force is applied. Resistive control circuit 123, using resistive sensor 121, detects the contact between the two layers and determines the location of the contact, allowing the system to react to the user touch accordingly.

The typical prior art system depicted in FIG. 1 contains both a proximity sensor and a resistive touch screen, but the solution is not efficient nor cost effective because it requires two distinct circuits. Accordingly, being able to use the resistive touch screen as a proximity sensor reduces the size and cost of the system, and does not add any additional components or chassis modification.

SUMMARY OF THE INVENTION

An embodiment of a use of a resistive touch screen apparatus used as a proximity sensor includes a touch screen with a top and bottom layer. When a user presses down on the top layer, it makes contact with the bottom layer. This embodiment includes a plurality of measurement circuits. In this embodiment the plurality of measurement circuits includes a resistive sensor circuit, which measures a touch position by measuring a voltage at the contact point between the top layer and bottom layer when the layers are pressed together. The plurality of measurement circuits also includes a proximity capacitance sensor circuit, which detects the presence and proximity of an object by measuring an equivalent capacitance created between the object and the touch screen. The control circuit connected to the touch screen selectively connects the resistive sensor circuit and the proximity capacitance sensor circuit with the touch screen.

Another embodiment of the present invention adds a bias circuit to the proximity capacitance sensor circuit. The bias circuit is active during the proximity sensing operation and biases the bottom layer of the touch screen. In one embodiment of the present invention, the bias circuit drives the bottom layer to the same voltage as the top layer. Because the top and bottom layer are close together, the effective capacitance between them can be quite large. By biasing the bottom and top layers to the same voltage, the effective capacitance of the touch screen can be negated, allowing the proximity capacitance operation to measure only the equivalent capacitance formed by the touch screen and the object.

In another embodiment of the invention, isolation circuitry can be used when disconnecting the various functions of the touch screen. For example, an analog switch or equivalent function might be used between the proximity capacitance sensor circuit and the touch screen to isolate the screen from the bias circuit during the resistive touch mode operation.

In one embodiment of the present invention, the control circuit connects each member of the plurality of measurement circuits in a sequence. In one embodiment where the plurality of measurement circuits includes only the resistive touch sensor circuit and the proximity capacitance sensor circuit, the result would results in an alternation between the two touch screen functions. One embodiment of the present invention periodically repeats this alternation sequence. By using a period of 5 ms or less, the resistive touch operation can occur frequently enough that both user touch inputs and proximity detection inputs are effectively detected.

Another embodiment of the present invention includes a control circuit using event driven control to determine which of the plurality of measurement circuits is connected to the touch screen. The event driven control can use the present state of the control circuit in combination with the current input to determine the appropriate next state of the control circuit. For example, if the present invention is used in a mobile phone, the event driven control could detect that the user is talking on the phone with face pressed against this screen. While the face remains pressed against the screen, the event driven control could avoid connecting the resistive sensor circuit to avoid unwanted user inputs.

In the embodiments of the present invention mentioned, the resistive touch screen operation can be accomplished using any operation mode that detects the position of a user touch by determining a voltage across at least one resistive layer. This operation can be accomplished with topologies including the use of two or more resistive layers, and includes the 4-wire method of operation typical of resistive touch screens. In addition, one of the layers can be comprised of a conductive material while the other layer is comprised of a resistive material. This type of configuration includes the 5-wire method of operation also typical of resistive touch screens.

Another embodiment of the present invention comprises a method for using a resistive touch screen as a proximity sensor. In a system comprising a resistive touch with a bottom and top layer and a plurality of measurement circuits including a capacitive proximity circuit and a resistive touch circuit, the method comprises several steps. This embodiment includes the step of performing a resistive touch operation which comprises the steps of disabling the plurality of measurement circuits, connecting the resistive touch circuit and the resistive touch screen, and measuring touch information obtained by the resistive touch screen. This embodiment also includes the step of performing a proximity capacitive sensing operation, comprising the steps of disabling the plurality of measurement circuits, operatively connecting the capacitive proximity circuit and the touch screen, and measuring proximity information obtained by the resistive touch screen. The next step comprises generating a mode selection signal comprising a touch state and a proximity state. When the mode selection signal is in the touch state, the method comprises performing the resistive touch operation. When the mode selection signal is in the proximity state, the method comprises performing the proximity capacitive sensing operation.

In another embodiment of the present invention, the method further comprises the step of connecting a bias circuit to the touch screen and driving the bottom layer causing the top layer and bottom layer to have substantially the same voltage.

In another embodiment of the present invention, the method comprises the additional step of sequentially performing the resistive touch operation and the proximity capacitive sensing operation. In another embodiment of the present invention the sequence of performing the resistive touch operation and the proximity operation repeats in a periodic alternation. At a frequency of 200 Hz or above, the resistive read operation occurs with sufficient frequency to properly detect user inputs, and each proximity sense operation also occurs with sufficient frequency to properly detect objects approaching. This corresponds to a periodic alternation period of five milliseconds or less.

In another embodiment of the touch screen, the step of mode selection signal generation is not only a function of a time period, but also is generated at least in part by an input from the touch screen. For example, the mode selection signal might stay in the proximity capacitance mode while an object such as the face of the user is in proximity with the screen. This will prevent the input of unwanted touch sensor position data during that time.

In another embodiment of a method of using a resistive touch screen as a proximity sensor, the steps of disabling the plurality of measurement circuits further comprises the step of electrically isolating at least one measurement circuit from the touch screen. For example, during the resistive touch operation, the step of disabling the plurality of measurement circuits might further include isolating the bias driver from the touch screen to prevent conflicts between the different modes of operation.

DETAILED DESCRIPTION OF THE PREFERRED EMBODIMENT

Figure 1:
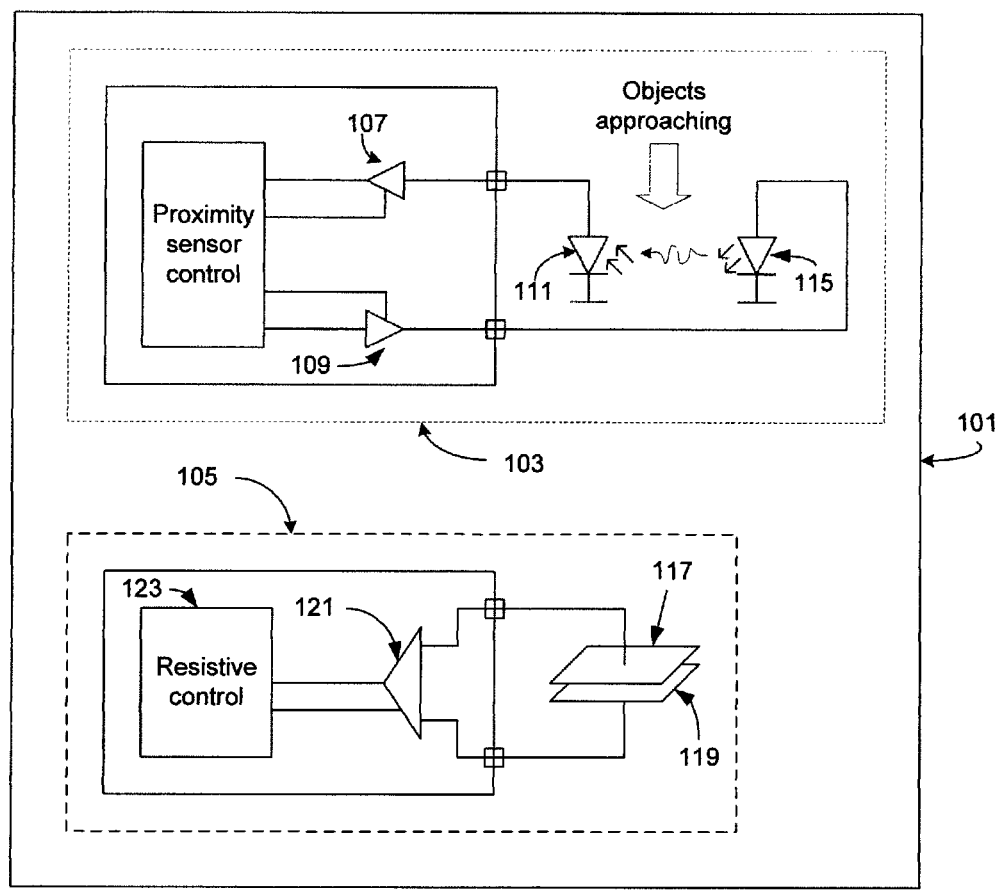
FIG. 1 depicts a simplified circuit diagram of a system that includes separate proximity sensor and resistive touch screen components that are typical of the prior art.
Figure 2:
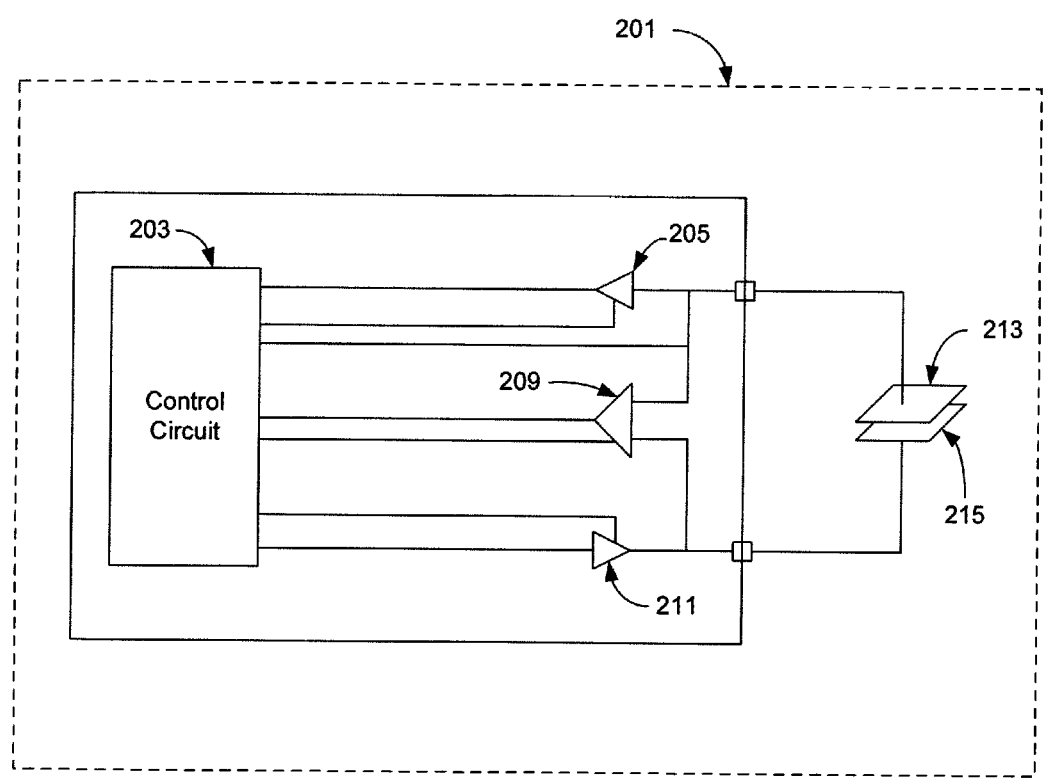
FIG. 2 depicts a circuit diagram of a resistive touch screen in accordance with an exemplary embodiment of the present invention.

An embodiment of the present invention includes an apparatus and method of using a resistive touch screen as a proximity sensor. FIG. 2 depicts a simplified circuit diagram of a resistive touch screen system 201 in accordance with an embodiment of the present invention. The resistive touch screen system 201 contains a control circuit 203, a proximity capacitive sensor circuit 205, a resistive sensor circuit 209, a bias driver 211, a top resistive layer 213 and a bottom resistive layer 215.

Figure 3:
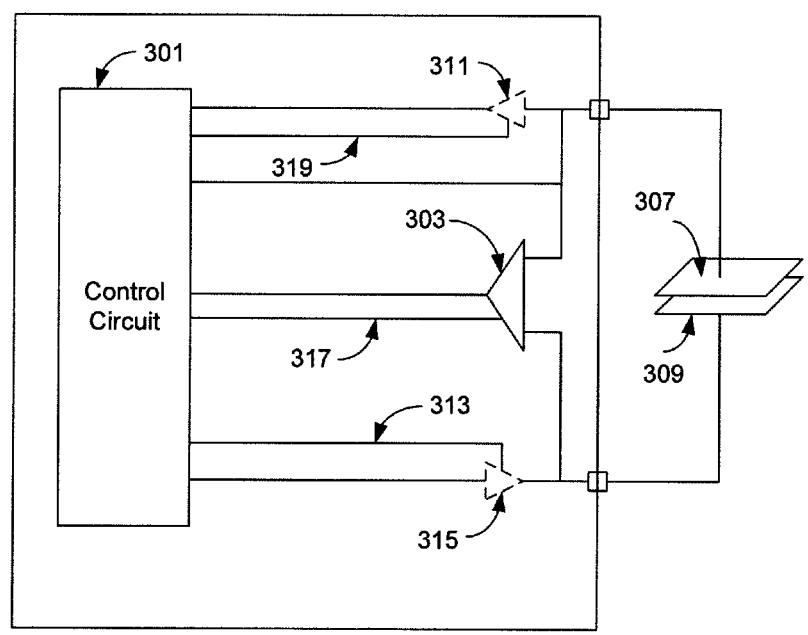
FIG. 3 depicts a simplified representation of the resistive touch screen during the resistive touch sensing operation in accordance with an embodiment of the present invention.

FIG. 3 depicts a simplified representation of the resistive touch screen system during the resistive touch sensing operation in accordance with an embodiment of the present invention. In this operation, control circuit 301 disables proximity capacitive sensor 311 and bias driver 315 by driving proximity capacitive enable signal 319 and bias driver signal 313 to a logical low. Control circuit 301 also enables resistive sensor 303 by driving resistive sensor enable signal 317 to a logical high. When a user presses down on top resistive layer 307, it makes contact with bottom resistive layer 309 at the coordinate where the force is applied. Control circuit 301, using resistive sensor 303, detects the contact between the two layers and determines the location of the contact. The touch location can be determined by measuring a voltage across a gradient in either a 4-wire or 5-wire touch screen configuration. The location information is then passed onto the system (not shown), allowing the system to react to the user touch accordingly.

Figure 4:
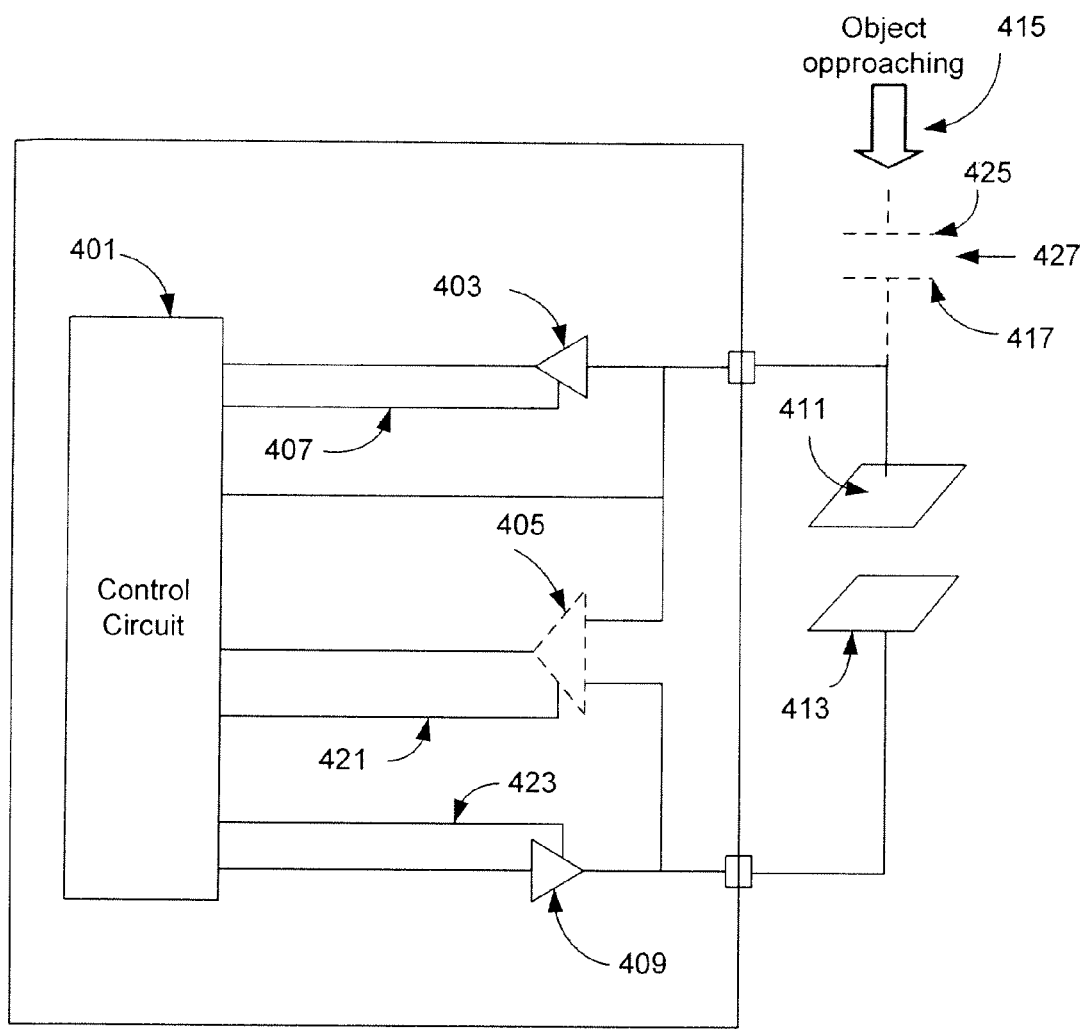
FIG. 4 depicts a simplified representation of the resistive touch screen during the proximity sensing operation in accordance with an embodiment of the present invention.

FIG. 4 depicts a simplified representation of the resistive touch screen during the proximity sensing operation in accordance with an embodiment of the present invention. In this operation, control circuit 401 disables resistive sensor 405 by driving resistive sensor enable signal 421 to a logical low. Control circuit 401 then enables proximity capacitive sensor 403 and bias driver 409 by driving proximity capacitive sensor enable signal 407 and bias driver enable signal 409 to a logical high. When object 415 approaches top resistive layer 411, equivalent capacitor 427 is formed. Object 415 effectively becomes terminal 425 of equivalent capacitor 427 and top resistive layer 411 becomes terminal 417. Bias driver 409 drives bottom resistive layer 413 to the same voltage level as resistive top layer 411, thus neutralizing any capacitance between top layer 411 and bottom layer 413. Proximity sensor circuit 403 is then enabled to detect the object approaching by sensing the capacitance change within equivalent capacitor 427.

In comparison with prior art resistive touch screens, the current invention allows the use of the resistive touch screen top layer as a proximity sensor because the control circuit can control when to enable and disable the resistive touch and proximity sensing operations. Such a control circuit can be implemented using an Application Specific Integrated Circuit (ASIC), Application Specific Standard Product (ASSP), programmable logic such as a Field Programmable Gate Array (FPGA), a microprocessor, or similar device known in the art.

Figure 5:
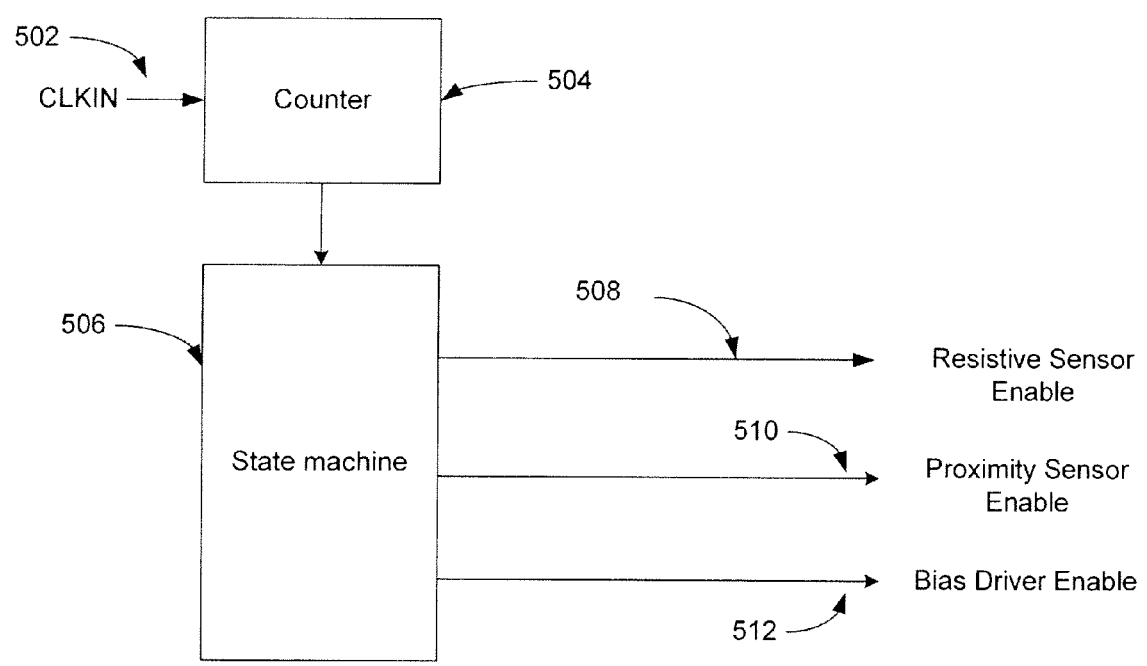
FIG. 5 depicts a simple circuit diagram of a control circuit in accordance with an exemplary embodiment of the present invention.

FIG. 5 depicts one embodiment of a resistive touch screen in accordance with the present invention, wherein a time-multiplexed control circuit enables resistive touch sensing for a period of time to detect possible inputs, after which it disables resistive touch sensing mode and enables proximity sensing mode. In this embodiment, counter 504 uses a fixed frequency clock signal 502 to determine time. State machine 506 uses the timing signal generated by counter 504 to determine whether the resistive touch screen should be in resistive touch sensing mode or proximity sensing mode. State machine 506 controls resistive sensor enable signal 508, proximity sensor enable signal 510 and bias driver enable signal 512 accordingly. It should be recognized by one of ordinary skill in the art that the state machine described above is only one possible implementation of the invention. Additional functions, such as reset of counter 504, can also be incorporated into the state machine when needed for a particular application. Other implementations, including software controllers, digital controllers, application specific standard product (ASSP), Field Programmable Gate Array (FPGA) or analog controllers are also possible and would similarly fall within the scope and spirit of the present invention.

Figure 6:
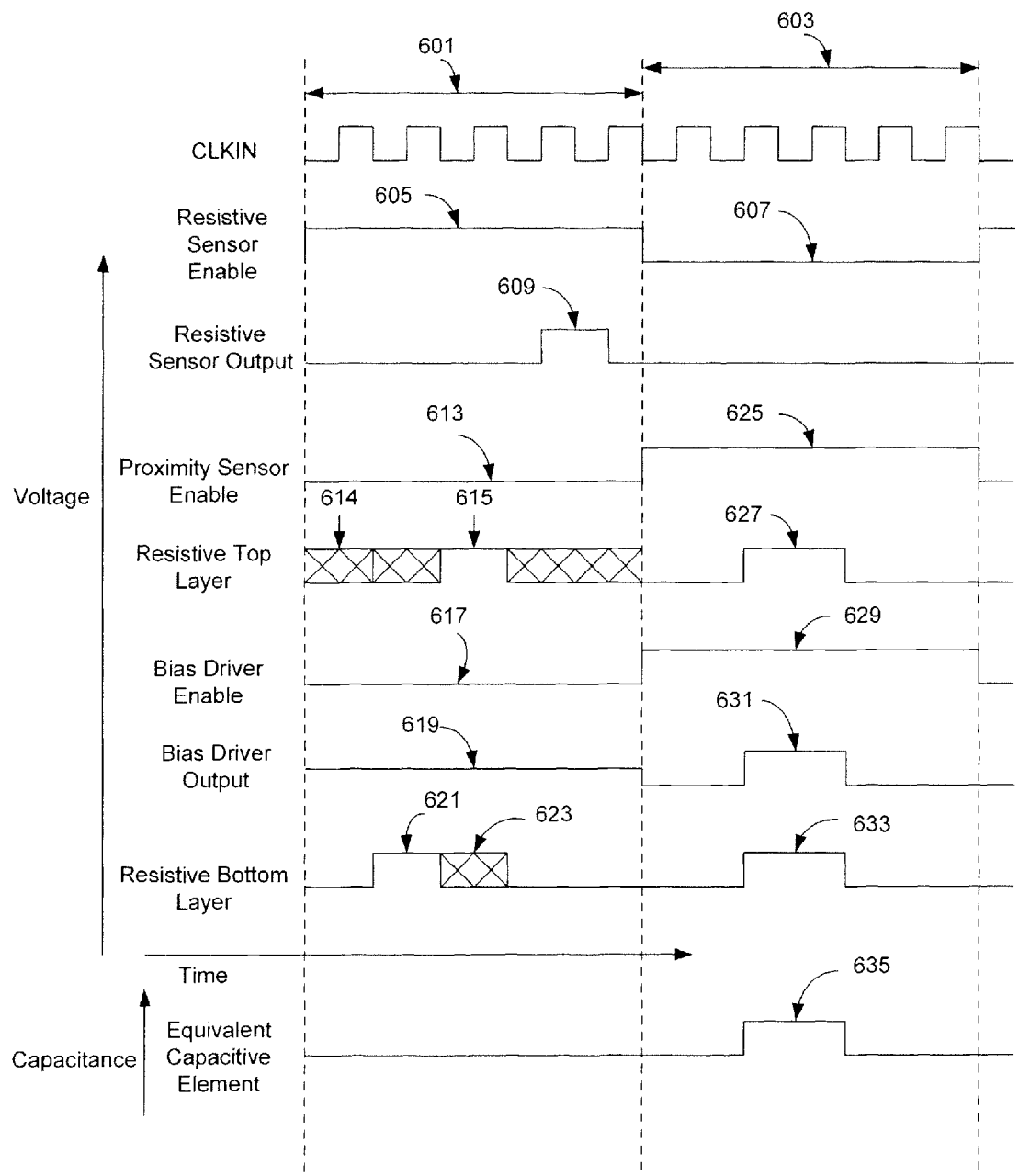
FIG. 6 depicts a voltage waveform and timing diagram associated with an embodiment of a resistive touch screen in accordance with the present invention.

In accordance with one embodiment of the present invention, FIG. 6 depicts an exemplary voltage level and timing diagram of the various signals during a complete timing cycle, spanning one resistive touch and proximity sensing operation. During resistive touch sensing operation 601, the resistor sensor circuit is enabled, as reflected by waveform 605. A voltage gradient is applied horizontally to the top resistive layer, as reflected by waveform 614. The bias driver is disabled, as reflected by waveform 617. The output of the bias driver becomes high impedance, as reflected by waveform 619, allowing the resistive sensor to properly interact with the bottom resistive layer. When the user touches the resistive touch screen, the two layers would make contact at the point of the touch. The bottom resistive layer is used to measure the voltage level of the top resistive layer at the point of touch, as reflected by waveform 621. A voltage gradient is then applied vertically to the bottom resistive layer, as reflected by waveform 623. Top resistive layer is then used to measure the voltage level of the bottom the layer at the point of touch, as reflected by waveform 615. The resistive sensor outputs the voltage level to control circuit 401, as reflected by waveform 609.

During proximity sensing operation 603, the resistive sensor is disabled, as reflected by waveform 607. The proximity sensor is enabled, as reflected by waveform 625. When an object approaches the resistive touch screen from above, it forms a capacitor with the top resistive layer, as reflected by waveform 635. A voltage level also appears on the top resistive layer, as reflected by waveform 627. The bias driver is enabled, as reflected by waveform 629. Therefore, the bias driver outputs the same voltage level that appeared at the top resistive layer, as reflected by waveform 631. The bottom resistive layer is driven to the same voltage level as the top resistive layer as reflected by waveform 633, resulting in a null voltage across the top and bottom resistive layers, and neutralizing any capacitance between the two layers. In a preferred embodiment of a resistive touch screen in accordance with present invention, a complete timing cycle, comprising resistive sense mode and proximity sense mode combined, has a duration of approximately 5 milliseconds (200 Hz). Of course, other operating frequencies are also possible and would fall within the scope and spirit of the present invention. At a frequency of 200 Hz or above, the resistive read operation occurs with sufficient frequency to properly detect user inputs, and each proximity sense operation also occurs with sufficient frequency to properly detect objects approaching.

In addition to reducing system size, complexity and cost, the present invention also prevents the false proximity sense read caused by objects or electrical interference approaching from below or underneath the resistive touch screen. When an object or electrical interference approaches the top resistive layer from the below, an equivalent capacitor, similar to equivalent capacitor 427, depicted in FIG. 4, is formed. The equivalent capacitor formed by the top resistive layer and the object approaching from the bottom could create a false proximity sense read with the proximity sensor. In an embodiment of the present invention, the bottom resistive layer acts as a shield for the resistive top layer because the bias driver, being low impedance, ensures that two layers are driven to the same voltage level during the proximity sense operation. The bottom resistive layer shielding prevents the formation of the capacitor between the top resistive layer and the approaching object or electrical interference from the bottom, therefore eliminating the possibility of a false proximity sense read.

Although a particular embodiment of a resistive touch screen was discussed here, other embodiments and implementations are possible and would also fall within the scope and spirit of the present invention. Similarly, the control circuit discussed above with reference to FIG. 5 can be easily adapted by one of ordinary skill in the art to handle other scenarios, such as an event driven scenario. For example, in an alternative embodiment, the system has a standby mode during which the proximity sensor is disabled to prevent the system from accidentally turning on when an object approaches it. Accordingly, the control circuit is designed such that when in standby mode, the resistive touch sensor is enabled and the proximity sensor is disabled. The control circuit will continuously monitor the resistive touch sensor and only enables the proximity sensor when a user input is detected.

What is claimed is:

1. A touch screen proximity sensing apparatus comprising:
   a touch screen comprising a bottom layer and a top layer wherein the top layer and bottom layer are oriented such that they are separate but capable of being temporarily pressed together by a user;
   a control circuit operatively connected to the touch screen;
   a plurality of measurement circuits comprising:
      a first measurement circuit comprising a resistive sensor circuit; and
      a second measurement circuit comprising a proximity capacitance sensor circuit;
   wherein the proximity capacitance sensor circuit detects an object by determining an equivalent capacitance between the touch screen and the object, and comprise a bias circuit configured to apply a particular voltage to the bottom layer of the touch screen, said particular voltage being substantially the same as the voltage applied to the top layer;
   wherein the resistive sensor circuit measures a touch position by measuring a voltage along a voltage gradient on at least one of the top layer and bottom layer;
   wherein the control circuit selectively connects the touch screen with one of the plurality of measurement circuits; and
   wherein the control circuit disables the first measurement circuit when said object is detected, said object being a face of said user, the control circuit only enabling the first measurement circuit when said object is no longer detected.

2. The apparatus of claim 1 wherein the control circuit further comprises an isolation circuit configured to isolate the touch screen from the plurality of measurement circuits.

3. The apparatus of claim 1 wherein the control circuit sequentially connects the touch screen with each one of the plurality of measurement circuits.

4. The apparatus of claim 3 wherein the control circuit connects the touch screen with each one of the plurality of measurement circuits in a sequence that repeats periodically.

5. The apparatus of claim 4 wherein a period of the sequence that repeats periodically is approximately five milliseconds.

6. The apparatus of claim 1 control circuit further comprising an event driven control for selectively connecting the touch screen and at least one of the plurality of measurement circuits;

wherein the event driven control determines which member of the plurality of measurement circuits to connect to the touch screen based at least in part on a recently measured input from the touch screen.

7. The apparatus of claim 1 wherein the top layer and the bottom layer comprise a resistive material.

8. The apparatus of claim 1 wherein the top layer comprises a conductive material and the bottom layer comprises a resistive material.

9. The apparatus of claim 1 wherein the bottom layer comprises a conductive material and the top layer comprises a resistive material.

10. In a system comprising a touch screen comprising a bottom layer and a top layer, and a plurality of measurement circuits comprising a capacitive proximity circuit and a resistive touch circuit, a method for proximity detection using the touch screen comprises the steps of:
   performing a resistive touch operation by a user comprising the steps of:
      disabling the plurality of measurement circuits that are not the resistive touch circuit;
      operatively connecting the resistive touch circuit and the touch screen; and
      measuring touch information obtained by the touch screen;
   performing a proximity capacitive sensing operation comprising the steps of:
      disabling the plurality of measurement circuits that are not the capacitive proximity circuit;
      operatively connecting the capacitive proximity circuit and the touch screen;
      applying a particular voltage to the bottom layer of the touch screen, the particular voltage being substantially the same as the voltage applied to the top layer of the touch screen; and
      measuring proximity information obtained by the touch screen;
   generating a mode selection signal comprising a touch state and a proximity state, said mode selection signal being maintained in said proximity state when a face of said user is detected to be in contact with said touch screen by said capacitive proximity circuit;
   performing the resistive touch operation when the mode selection signal is in the touch state; and
   performing the proximity capacitive sensing when the mode selection signal is in the proximity state.

11. The method of claim 10 further comprising the step of sequentially performing the resistive touch operation and the proximity capacitive sensing operation.

12. The method of claim 11 wherein the sequence of performing the resistive touch operation and the proximity capacitive sensing operation repeats periodically.

13. The method of claim 11 wherein the resistive touch operation and the proximity capacitive sensing operation repeat periodically with a period of approximately five milliseconds.

14. The method of claim 10 wherein the mode selection signal is generated at least in part by an input from the touch screen.

15. The method of claim 10 wherein the step of disabling the plurality of measurement circuits further comprises the step of electrically isolating at least one measurement circuit from the touch screen.

* * * * *